United States Patent
Charbonnel

(10) Patent No.: US 10,851,725 B2
(45) Date of Patent: Dec. 1, 2020

(54) FUEL CONTENT DETECTION BASED ON A MEASUREMENT FROM A SENSOR AND A MODEL ESTIMATION OF THE MEASUREMENT

(71) Applicant: Caterpillar Inc., Deerfield, IL (US)

(72) Inventor: Sylvain Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 174 days.

(21) Appl. No.: 16/224,070

(22) Filed: Dec. 18, 2018

(65) Prior Publication Data

US 2020/0191073 A1    Jun. 18, 2020

(51) Int. Cl.
| | | |
|---|---|---|
| G01M 15/04 | (2006.01) | |
| F02D 41/00 | (2006.01) | |
| F01N 9/00 | (2006.01) | |
| F02D 41/14 | (2006.01) | |
| F01N 11/00 | (2006.01) | |
| F02D 41/22 | (2006.01) | |

(52) U.S. Cl.
CPC ........ *F02D 41/0052* (2013.01); *F01N 9/002* (2013.01); *F01N 11/002* (2013.01); *F02D 41/1459* (2013.01); *F02D 41/1462* (2013.01); *F01N 2560/026* (2013.01); *F01N 2610/03* (2013.01); *F01N 2900/1602* (2013.01); *F02D 2041/224* (2013.01); *F02D 2200/0612* (2013.01)

(58) Field of Classification Search
CPC ....... F02D 2041/224; F02D 2200/0611; F02D 2200/0612
USPC .............................. 73/114.38, 114.52, 114.55
See application file for complete search history.

(56) References Cited

U.S. PATENT DOCUMENTS

| | | |
|---|---|---|
| 7,412,822 B2 | 8/2008 | Zhan et al. |
| 8,156,787 B2 | 4/2012 | Asanuma et al. |
| 8,361,395 B2 | 1/2013 | Rebinsky et al. |
| 8,776,501 B2 | 7/2014 | Carlill et al. |
| 2003/0029427 A1* | 2/2003 | Esteghlal ............ F02D 41/0032 123/698 |
| 2003/0134425 A1* | 7/2003 | Ceccarini ............ F02D 41/1462 436/119 |
| 2008/0165361 A1* | 7/2008 | Kauffman ............... G01N 31/22 356/402 |

(Continued)

FOREIGN PATENT DOCUMENTS

| | | |
|---|---|---|
| WO | 2012130890 A1 | 10/2012 |
| WO | 2014007749 A1 | 1/2014 |
| WO | 2017130408 A1 | 8/2017 |

*Primary Examiner* — Eric S. McCall
(74) *Attorney, Agent, or Firm* — Harrity & Harrity LLP

(57) ABSTRACT

A fuel content detection system is disclosed. The fuel content detection system may include an engine control module (ECM) to receive a measurement of a parameter. The parameter may correlate with an amount of a substance in a fuel that is being consumed in an engine. The ECM may determine an estimation of the parameter based on a model. The model may use a predetermined value associated with the amount of the substance, and the engine may be configured to consume a designated type of fuel that includes an amount of the substance that corresponds to the predetermined value. The ECM may determine, based on the estimation and the measurement not being within a threshold range, that the fuel is not the designated type of fuel and perform an action associated with the engine.

20 Claims, 3 Drawing Sheets

(56) References Cited

U.S. PATENT DOCUMENTS

| | | | |
|---|---|---|---|
| 2009/0241638 A1* | 10/2009 | Asanuma | G01N 33/287 |
| | | | 73/28.04 |
| 2009/0319195 A1* | 12/2009 | Hoots | G01N 33/2852 |
| | | | 702/25 |
| 2010/0082222 A1* | 4/2010 | Alark | F02D 19/061 |
| | | | 701/103 |
| 2011/0132342 A1* | 6/2011 | Soltis | G01N 33/2852 |
| | | | 123/703 |
| 2014/0230532 A1 | 8/2014 | Huq et al. | |
| 2015/0039207 A1* | 2/2015 | Oryoji | F02D 19/088 |
| | | | 701/103 |
| 2015/0192085 A1* | 7/2015 | Surnilla | G01M 15/104 |
| | | | 123/434 |
| 2016/0245193 A1* | 8/2016 | Makled | F02D 41/0025 |
| 2017/0241974 A1* | 8/2017 | Zard | C10L 1/02 |

* cited by examiner

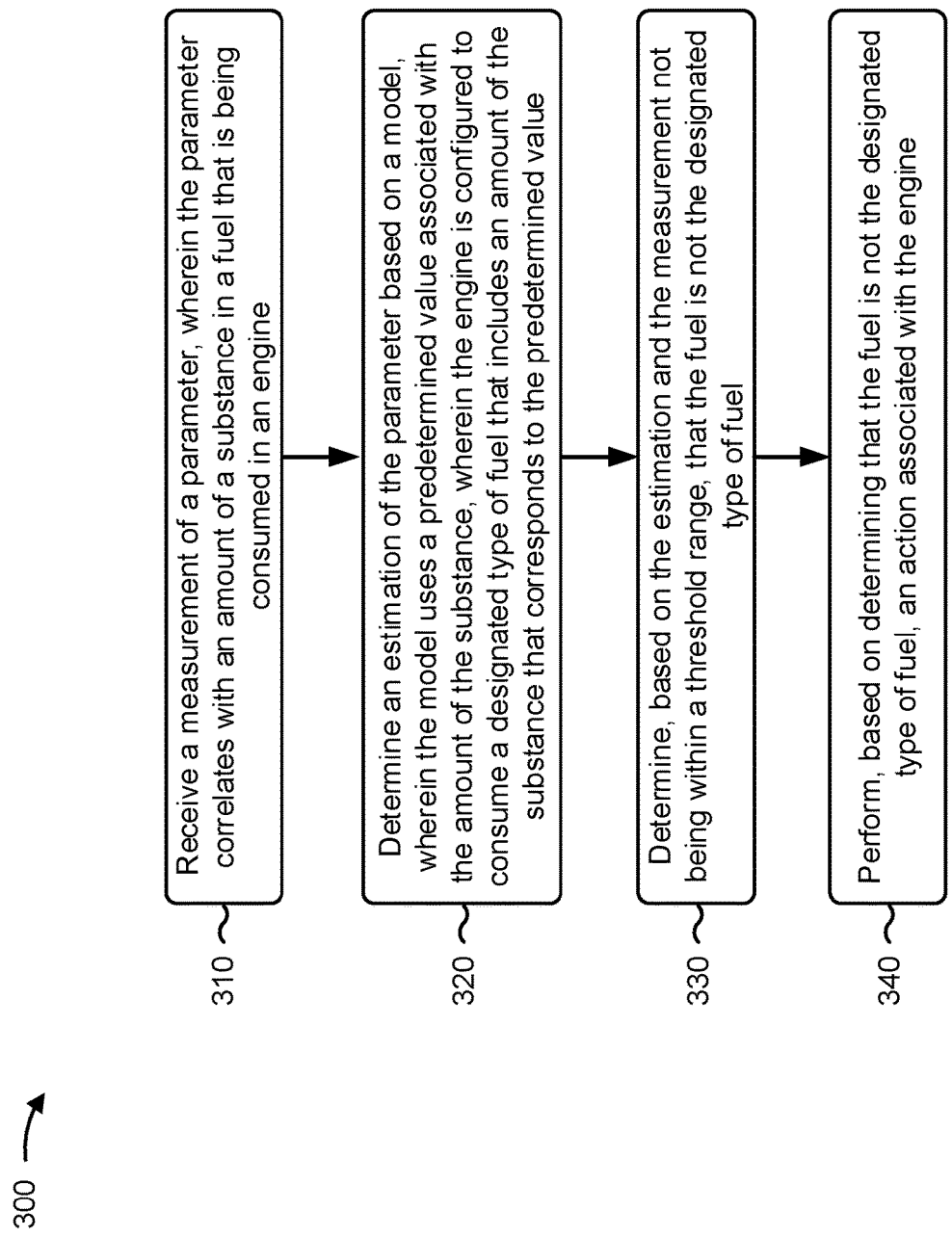

FUEL CONTENT DETECTION BASED ON A MEASUREMENT FROM A SENSOR AND A MODEL ESTIMATION OF THE MEASUREMENT

TECHNICAL FIELD

The present disclosure relates generally to fuel consuming engines and, more particularly, to fuel content detection based on a measurement from a sensor and a model estimation of the measurement.

BACKGROUND

Performance of an engine (e.g., an internal combustion engine, such as a gasoline engine, a diesel engine, and/or the like) can be impacted by the fuel used to operate the engine. For example, the engine may be configured to operate using a designated fuel type. If a user (e.g., an operator associated with a machine powered by the engine) supplies the engine with an improper fuel, the engine may not operate as designed and/or may experience one or more failures. For example, if an engine is configured to use a low sulfur fuel, but the user provides the engine with a fuel that has a relatively high amount of sulfur, the performance of the engine and/or an aftertreatment device associated with the engine may be inhibited. Accordingly, a monitoring system associated with the engine may be configured to monitor the operation of the engine and/or monitor fuel being consumed by the engine and/or to detect certain substances within the fuel.

One approach to detect sulfur is disclosed in U.S. Pat. No. 8,776,501 that issued to Carlill et al. on Jul. 15, 2014 ("the '501 patent"). In particular, the '501 patent discloses "the control system [ . . . ] may also include a sulfur detection routine [ . . . ] to detect sulfur deactivation. Sulfur deactivation may be prevented or reduced through the use of low or ultra-low sulfur fuel [ . . . ]. The sulfur detection routine [ . . . ] detects when sulfur deactivation has occurred and therefore may provide an indication that low sulfur fuel was not used." The '501 patent further discloses "the controller determines whether the [diesel oxidation catalyst] DOC [ . . . ] and [diesel particulate filter] DPF [ . . . ] have been deactivated by sulfur."

While the control system of the '501 patent may "detect sulfur," the '501 patent detects sulfur based on a deactivation of the DOC and/or DPF, which can negatively impact the performance of the engine.

The fuel content detection system of the present disclosure can robustly determine the content of a fuel to prevent negatively impacting the performance of the engine in such a manner, to optimize a performance of the engine based on the detected content of the fuel and/or solve other problems in the art.

SUMMARY

According to some implementations, a method may include receiving a measurement of a parameter, wherein the measurement correlates with an amount of a substance in a fuel used during operation of an engine; determining, using a model, an estimation of the parameter, wherein, to determine the estimation of the parameter, the model uses a predetermined value associated with the amount of the substance; determining, based on the estimation and the measurement, whether the predetermined value is representative of the amount of the substance in the fuel, wherein the predetermined value is determined to be representative of the amount of the substance when the estimation is within a threshold range of the measurement; and performing, based on whether the predetermined value is determined to be representative of the amount of the substance in the fuel, an action associated with the engine.

According to some implementations, an engine control module may include a memory and one or more processors, communicatively coupled to the one or more memories, to: receive a measurement of a parameter, wherein the parameter correlates with an amount of a substance in a fuel that is being consumed in an engine; determine an estimation of the parameter based on a model, wherein the model uses a predetermined value associated with the amount of the substance, wherein the engine is configured to consume a designated type of fuel that includes an amount of the substance that corresponds to the predetermined value; determine, based on the estimation and the measurement not being within a threshold range, that the fuel is not the designated type of fuel; and perform, based on determining that the fuel is not the designated type of fuel, an action associated with the engine.

According to some implementations, a system may include an engine configured to, during operation, consume a designated type of fuel that includes a threshold amount of sulfur; a sensor; and an engine control module configured to, while the engine is consuming a fuel during operation: receive, from the sensor, a measurement of a parameter of the engine, wherein the parameter correlates with an amount of sulfur in the fuel; determine, using a model, an estimation of the parameter, wherein, to determine the estimation of the parameter, the model assumes a value of the amount of sulfur in the fuel that correlates with the threshold amount of sulfur; determine, based on the estimation and the measurement, that the amount of sulfur in the fuel does not satisfy the threshold amount of sulfur; and perform, based on determining that the amount of sulfur in the fuel does not satisfy the threshold amount of sulfur, an action associated with the engine.

BRIEF DESCRIPTION OF THE DRAWINGS

FIG. 3 is a flow chart of an example process for fuel content detection based on a measurement from a sensor and a model estimation of the measurement.

DETAILED DESCRIPTION

This disclosure relates to detection of an amount of a substance in fuel associated with an engine. The substance may be sulfur, which can be detected using a substance detection module of an engine control module (ECM) as described herein. In some implementations, other substances may be detected according to the example implementations described herein.

The ECM, which may include the substance detection module as described herein, has universal applicability to any machine utilizing such an ECM. The term "machine" may refer herein to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, aerial equipment, underground equipment, or marine equipment. Moreover, one or more implements may be connected to the machine and driven from the ECM.

Figure 1:
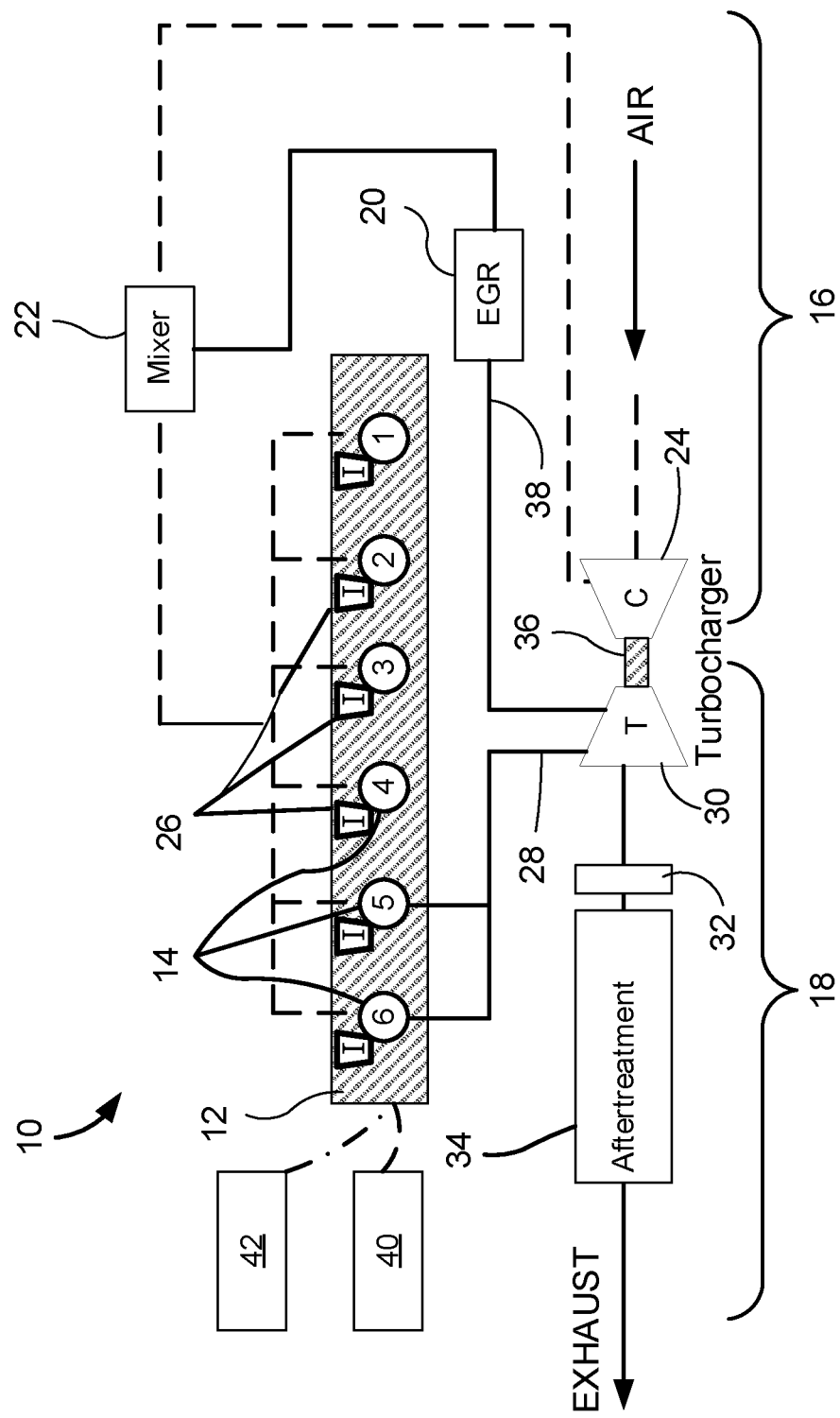
FIG. 1 is diagram of an example power system, including an engine, described herein.

FIG. 1 is a diagram of an example power system 10 described herein. The power system 10 may be described herein as a compression ignition, internal combustion engine. However, the power system 10 may include any other type of internal combustion engine, such as, for example, a spark, laser, a plasma ignition engine, and/or the like. The power system 10 may be fueled by such fuels as distillate diesel fuel, biodiesel, dimethyl ether, gaseous fuels (such as hydrogen, natural gas, propane, etc.), alcohol, ethanol, and/or any combination thereof.

Power system 10, of FIG. 1, includes an engine 12 with a plurality of cylinders 14 (engine 12 of FIG. 1 is shown with six cylinders 14). A piston assembly may be included within each of cylinders 14 to form a combustion chamber within each cylinder 14. Power system 10 may include any number of combustion chambers, and the combustion chambers may be disposed in an in-line configuration, a "V" configuration, or in any other suitable configuration. Furthermore, the power system 10 may consume one or more consumable resources (e.g., a fuel (e.g., gasoline, diesel fuel, and/or the like), a diesel exhaust fluid (DEF), one or more coolants, one or more lubricants (e.g., an oil, a grease, and/or the like), and/or the like) during operation (e.g., due to combustion in the engine). As described herein, the engine may be configured and/or designed to consume a designated fuel type. For example, the engine may be configured to consume a low sulfur content fuel (e.g., a fuel that has less than 3000 parts per million (ppm), less than 1400 ppm, less than 500 ppm, and/or the like), an ultra-low sulfur content fuel (e.g., a fuel that has less than 50 ppm, less than 30 ppm, less than 15 ppm, and/or the like), and/or the like. Although some implementations described herein may refer to detecting an amount of sulfur content within a fuel, one or more other substances may also be monitored and/or detected as described herein.

Power system 10 may include multiple systems. For example, as shown in the example of FIG. 1, power system 10 may include an air intake or air induction system 16, an exhaust system 18, and an exhaust gas recirculation (EGR) system 20. Air induction system 16 may be configured to direct air, or an air and fuel mixture (e.g., of air and another gas, such as exhaust gas) into power system 10 for subsequent combustion. Exhaust system 18 may exhaust or release byproducts of the combustion to an atmosphere external to power system 10. A recirculation loop of the EGR system 20 may be configured to direct a portion of the exhaust gases from exhaust system 18 back into air induction system 16 for subsequent combustion.

Air induction system 16 may include multiple components that cooperate to condition and introduce compressed air into cylinders 14. For example, air induction system 16 may include a mixer 22, or intake manifold, located downstream of one or more compressors 24. The air induction system 16 feeds variable valve actuators 26 associated with respective ones of cylinders 14. In some implementations, air induction system 16 may include a throttle valve, an air cooler, a filtering component, a compressor bypass component, and/or the like. In some implementations, one or more sensors may be configured to provide measurements associated with air induction system 16 to permit a content of fuel associated with the engine to be determined.

Exhaust system 18 may include multiple components that cooperate to condition and direct exhaust from cylinders 14 to the atmosphere. For example, exhaust system 18 may include an exhaust passageway 28, one or more turbines 30 driven by exhaust flowing through exhaust passageway 28, a particulate collection device 32, such as a diesel particulate filter (DPF) located downstream of turbine 30, and an exhaust aftertreatment device 34 (e.g., an aftertreatment selective catalytic reduction (SCR) device) fluidly connected downstream of particulate collection device 32. In some implementations, a sensor (e.g., a soot level sensor) may be configured to measure a soot level associated with the DPF and/or provide a measurement that indicates an amount of soot that is in the DPF. In some implementations, exhaust system 18 may include one or more bypass components, an exhaust compression or restriction brake, an attenuation device, additional exhaust treatment devices, and/or the like.

Turbine 30 may be located to receive exhaust leaving power system 10 and may be connected to the one or more compressors 24 of air induction system 16 by way of a common shaft 36 to form a turbocharger. As exhaust gases exiting power system 10 flow through turbine 30 and expand against vanes thereof, turbine 30 may rotate and drive the one or more compressors 24 to pressurize inlet air.

In some implementations, particulate collection device 32 may be a DPF located downstream of turbine 30 to remove particulate matter from the exhaust flow of power system 10. In some implementations, particulate collection device 32 may include an electrically conductive or non-conductive coarse mesh metal or porous ceramic honeycomb medium. As the exhaust flows through the medium, particulates may be blocked by and trapped in the medium. Over time, the particulates may build up within the medium and, if unaccounted for, could affect engine performance by increasing exhaust backpressure. To minimize backpressure effects on engine performance, the collected particulates may be passively and/or actively removed through a regeneration process. When passively regenerated, the particulates deposited on the medium may chemically react with a catalyst (for example, a base metal oxide, a molten salt, and/or a precious metal that is coated on or otherwise included within particulate collection device 32) to lower the ignition temperature of the particulates. Because particulate collection device 32 may be closely located downstream of engine 12 (e.g., immediately downstream of turbine 30, in one example), the temperatures of the exhaust flow entering particulate collection device 32 may be controlled to be high enough, in combination with the catalyst, to burn away the trapped particulates. When actively regenerated, heat is applied to the particulates deposited on the filtering medium to elevate the temperature thereof to an ignition threshold. In accordance with yet other implementations described herein, an active regeneration device (not shown), such as a fuel-fired burner or an electric heater, may be located proximal to (e.g., upstream of) particulate collection device 32 to assist in controlling the regeneration of particulate collection device 32. A combination of passive and active regeneration may be utilized, if desired.

Exhaust aftertreatment device 34 may receive exhaust from turbine 30 and trap or convert particular constituents in the gas stream. In one example, exhaust aftertreatment device 34 may embody an SCR device having a catalyst substrate located downstream from a reductant injector. A gaseous or liquid reductant, most commonly urea, or a water and urea mixture, may be sprayed or otherwise advanced into the exhaust upstream of catalyst substrate by a reductant injector. As the reductant is absorbed onto the surface of the catalyst substrate, the reductant may react with NOx (NO and $NO_2$) in the exhaust gas to form water ($H_2O$) and elemental nitrogen ($N_2$). According to some implementations, a sensor (e.g., a NOx emission sensor) may be configured (e.g., within exhaust aftertreatment device 34) to measure a NOx level in the exhaust and/or provide a measurement that indicates an amount of NOx in the exhaust. In some implementations, a hydrolysis catalyst may be associated with catalyst substrate to promote even distribution and conversion of urea to ammonia. Furthermore, a sensor (e.g., an ammonia emission sensor) may be configured (e.g., within exhaust aftertreatment device 34) to measure an ammonia level of the exhaust and/or provide a measurement that indicates an amount of ammonia in the exhaust.

In some implementations, the reduction process may include an oxidation catalyst (e.g., a diesel oxidation catalyst (DOC)), which, for example, may include a porous ceramic honeycomb structure or a metal mesh substrate coated with a material (e.g., a precious metal) that catalyzes a chemical reaction to alter the composition of the exhaust. For example, the oxidation catalyst may include platinum that facilitates the conversion of NO to $NO_2$, and/or vanadium that suppresses the conversion. According to some implementations, a sensor may be configured to measure a temperature of the oxidation catalyst and/or another component of exhaust aftertreatment device 34. For example, a temperature sensor of exhaust aftertreatment device 34 may be configured to measure and provide a temperature measurement associated with a DOC (e.g., an inlet temperature measurement of the DOC, an outlet temperature measurement of the DOC) of exhaust aftertreatment device 34. In some implementations, the temperature sensor may measure and/or provide the temperature measurement associated with (or during) a hydrocarbon dosing of the DOC.

Exhaust aftertreatment device 34 may require desulphation to maintain an acceptable NOx conversion rate. Similar to a regeneration event of particulate collection device 32, the desulphation event may require increased exhaust temperatures. Decoupling an intake valve actuation (IVA) control from the EGR control during desulphation, for example, may provide enhanced capability for thermal management of the exhaust during such maintenance events.

When utilizing EGR in a turbocharged diesel engine, as shown in FIG. 1, the exhaust gas to be recirculated may be removed upstream of the exhaust gas driven turbine 30 associated with the turbocharger. For example, in many EGR applications, the exhaust gas may be diverted from the exhaust passageway 28 and diverted via an EGR conduit 38 to air induction system 16. Likewise, the recirculated exhaust gas may be re-introduced to the air induction system 16 downstream of the compressor 24. In some implementations, EGR system 20 may be an external EGR system and/or may include various features for implementation of the methods and/or processes described herein, such as a system of primary control valves and/or bypass valves to allow an engine control module (ECM) 40 to control various flows through the EGR system during certain engine operating conditions.

As described herein, various measurements associated with power system 10 may be made to monitor for and/or detect an amount of a substance (e.g., sulfur or any other substance that may be in a fuel consumed by engine 12) in a fuel of engine 12 (e.g., a fuel being consumed by engine 12, a fuel in a reservoir associated with power system 10, and/or the like). The various measurements may indicate a value of a parameter that correlates to an amount of the substance within the fuel. Furthermore, the measurements may be compared against corresponding estimations of the parameters. For example, one or more models associated with the parameters may be run based on one or more of the various measurements and using a predetermined value (e.g., an assumed value, a constant, and/or the like) for the amount of the substance in the fuel. In some implementations, the predetermined value may correspond to an amount of the substance in a designated type of fuel (which may be referred to herein as a "designated fuel type") associated with the engine. The designated type of fuel may correspond to a fuel that engine 12 is configured to consume to achieve one or more desired operating conditions (e.g., an optimal operating condition according to the configuration of the engine).

Furthermore, as described herein, power system 10 may be controlled (e.g., by ECM 40) according to a determined amount of the substance that is in the fuel being consumed by the engine. For example, if the amount of the substance is determined to satisfy a threshold amount, the ECM 40 may alter the operation of power system 10 and/or engine 12 (e.g., to throttle back power output, to shut down power system 10, to cease an operation of engine 12, to cause engine 12 to run at a higher temperature (e.g., to burn off the substance in the fuel), and/or the like). Additionally, or alternatively, ECM 40 may provide a notification indicating that the threshold amount of the substance has been detected in the fuel (e.g., indicating that engine 12 is not operating using the designated type of fuel for engine 12). In this way, power system 10 may be controlled according to a determined amount of a substance in a fuel associated with engine 12.

Power system 10 of FIG. 1 includes ECM 40, which may provide control of power system 10. In some implementations, ECM 40 may monitor and/or detect the substance in the fuel of the engine based on one or more measurements, associated with parameters of power system 10, received from sensor system 42, and based on one or more estimations of the parameters associated with power system 10. In some implementations, ECM 40 may monitor and/or detect an amount of the substance in the fuel in order to cause the engine to be controlled (e.g., by a plurality of control devices of power system 10, such as valves, actuators, temperature management devices, and/or the like) to account for the amount of the substance in the fuel.

ECM 40 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, and/or a combination of hardware and software. In some implementations, ECM 40 includes one or more processors capable of being programmed to perform a function. In some implementations, one or more memories, including a random-access memory (RAM), a read only memory (ROM), and/or another type of dynamic or static storage device (e.g., a flash memory, a magnetic memory, and/or an optical memory) may store information and/or instructions for use by ECM 40. In some implementations, ECM 40 may include a memory (e.g., a non-transitory computer-readable medium) capable of storing instructions, that when executed, cause the processor to perform one or more processes and/or methods described herein.

ECM 40 may execute the instructions to perform various control functions and processes to control power system 10, and to automatically determine a probability that a threshold amount of a substance is in a fuel associated with engine 12 (e.g., a fuel being consumed by engine 12 and/or a fuel that may be consumed by engine 12). ECM 40 may include any appropriate type of engine control system configured to perform engine control functions such that power system 10 may operate properly. Further, ECM 40 may also control another system of a vehicle or machine, such as a transmission system, a hydraulics system, and/or the like.

Sensor system 42 may provide measurements associated with various parameters and may be used by ECM 40 to control power system 10 and/or to determine whether the fuel being consumed by engine 12 is a designated type of fuel for engine 12. Sensor system 42 may include physical sensors and/or any appropriate type of control system that generates values of parameters (which may be referred to herein as "measurements") based on a computational model and/or one or more measured parameters. As used herein, "parameters" may refer to those parameters that are directly measured by sensors of sensor system 42 and/or estimated by one or more models. Example sensors may include a temperature sensor, a speed sensor, a chemical composition sensor (e.g., a soot level sensor, a NOx emission sensor, an ammonia emission sensor, and/or the like), a radio frequency (RF) sensor (e.g., a soot level sensor), a pressure sensor, and/or the like. Measurements associated with the parameters, as used herein, may refer to any values relevant to the parameters and indicative of the state of power system 10. For example, measurements may include machine and/or environmental parameters, such as a soot level, a NOx level, an ammonia level, a temperature value (e.g., an outlet temperature associated with a DOC of exhaust aftertreatment device 34), a compression ratio, a turbocharger efficiency, an after cooler characteristic, a pressure value, an ambient condition, a fuel rate, an engine speed, and/or the like. In some implementations, the measurements may be inputs to one or more models (e.g., a soot level estimation model, a NOx level estimation model, an ammonia level estimation model, a hydrocarbon dosing estimation model, a DOC temperature estimation model, and/or the like) used by ECM 40 to estimate a value of the parameter, as described herein.

Sensor system 42 may be configured to coincide with ECM 40, may be configured as a separate control system, and/or may be configured as a part of other control systems. Further, ECM 40 may implement sensor system 42 by using computer software, hardware, and/or a combination of software and hardware. For example, ECM 40 may execute instructions to cause sensors of sensor system 42 to sense and/or generate measurements based on a fuel monitoring model and/or other parameters.

As indicated above, FIG. 1 is provided as an example. Other examples may differ from what is described in connection with FIG. 1.

Figure 2:
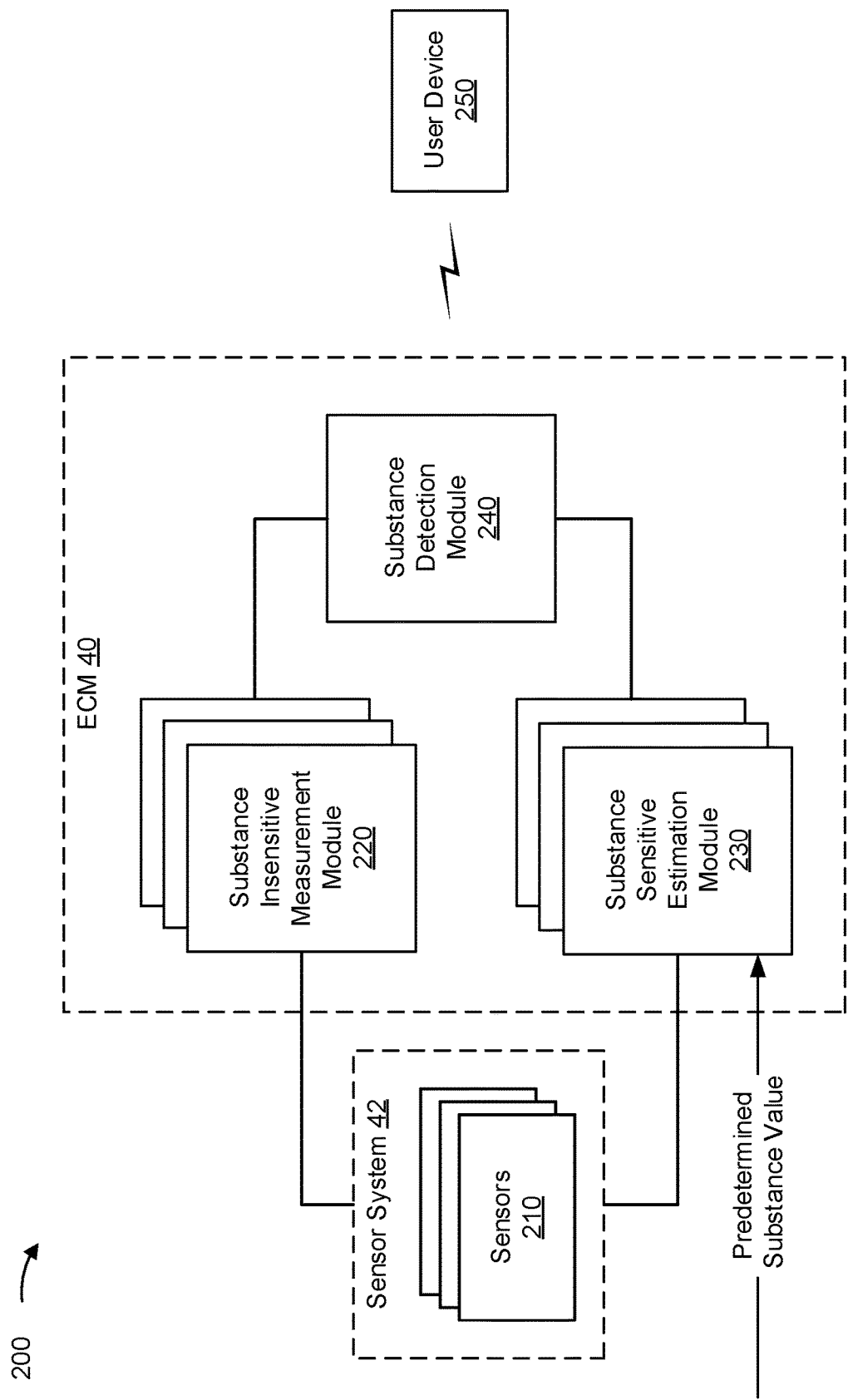
FIG. 2 is diagram of an example fuel content detection system that may be included within the power system of FIG. 1, as described herein.

FIG. 2 is a diagram of an example fuel content detection system 200 in which systems and/or methods described herein may be implemented. As shown in FIG. 2, fuel content detection system 200 may include one or more sensors 210 (referred to individually as "sensor 210" and collectively as "sensors 210"), one or more substance insensitive measurement modules 220 (referred to individually as "substance insensitive measurement module 220" and collectively as "substance insensitive measurement modules 220"), one or more substance sensitive estimation modules 230 (referred to individually as "substance sensitive estimation module 230" and collectively as "substance sensitive estimation modules 230"), a substance detection module 240, and a user device 250. As shown in the example of FIG. 2, sensors 210 may be sensors of sensor system 42, and substance insensitive measurement module 220, substance sensitive estimation module 230, and substance detection module 240 may be included within (and/or modules of) ECM 40. Devices and/or components of fuel content detection system 200 may interconnect via wired connections, wireless connections, or a combination of wired and wireless connections.

Sensors 210 may include any type of sensor configured to measure one or more parameters of power system 10. Values associated with the one or more parameters of power system 10 may correlate to an amount of a substance in a fuel being consumed by engine 12. As examples, the sensors 210 may include RF sensors, temperature sensors, position sensors (e.g., to detect a position of a valve, an actuator, an engine part (e.g., a piston), and/or the like), speed sensors (e.g., to detect an engine speed, a machine speed, and/or the like), pressure sensors (e.g., to detect a measure of compression of air or exhaust in power system 10), emissions sensors (e.g., to detect emission levels of exhaust of power system 10), and/or the like.

In some implementations, sensor 210 may include a soot level sensor (or components of a sensor used to measure a soot level). For example, the soot level sensor may be an RF sensor that measures an attenuation of an RF signal transmitted through a DPF of exhaust aftertreatment device 34. In such a case, a soot level can be determined based on how much power of the RF signal is lost when transmitted through the DPF. The greater the attenuation of the RF signal, the greater the amount of soot in the DPF (e.g., because the soot absorbs the power). Additionally, or alternatively, the soot level sensor may be a pressure sensor associated with the DPF that measures a back pressure of the DPF. For example, the greater the amount of back pressure at the DPF, the greater the amount of soot in the DPF (e.g., due to the soot blocking air flow through the DPF). A soot level of the DPF may correlate to an amount of a substance in a fuel that is being consumed by engine 12. For example, the greater the soot level of the DPF, the greater the probability that the fuel includes a relatively high amount of sulfur (e.g., more sulfur than a designated type of fuel for engine 12).

In some implementations, sensor 210 may include a NOx emission sensor (or components of a sensor used to measure a NOx level) and/or an ammonia sensor (or components of a sensor user to measure an ammonia level) that are configured to determine a NOx level of the exhaust of engine 12 and/or an ammonia level of the exhaust of engine 12, respectively. For example, the NOx emission sensor and/or the ammonia sensor may be a gas sensor or air sensor that is configured to detect content of the gas and/or air. In some implementations, the NOx emission sensor and/or the ammonia sensor may determine an amount of NOx (e.g., a NOx level) and/or an amount of ammonia (e.g., an ammonia level) in exhaust of exhaust aftertreatment device 34. The NOx level and/or the ammonia level in the exhaust may respectively correlate to an amount of a substance in a fuel that is being consumed by engine 12. For example, the greater the amount of NOx and/or the greater the amount of ammonia in exhaust aftertreatment device 34, the greater the probability that the fuel includes a relatively high amount of sulfur.

In some implementations, sensor 210 may include a temperature sensor (or components of a temperature sensor) that is configured to determine an outlet temperature of a DOC of exhaust aftertreatment device 34. For example, the temperature sensor may be configured to detect the temperature of the exhaust that flowed through the DPF. In some implementations, the temperature sensor may measure the temperature during a hydrocarbon dosing of the DPF. The outlet temperature of the DOC may correlate to an amount of a substance in a fuel being consumed by engine 12. For example, the lower the outlet temperature of the DOC, the greater the amount of sulfur in the fuel (e.g., due to the sulfur absorbing and/or de-activating the DOC catalyst).

Additionally, or alternatively, ECM 40 may obtain, from sensors 210, measurements and/or information that indicates an amount of fuel supplied during a hydrocarbon dosing of the DOC. The amount of fuel may correlate to an amount of fuel needed for the DOC to be at a target temperature during operation of engine 12. For example, ECM 40 may determine timing associated with supplying the fuel, pressure associated with the fuel, flow associated with the fuel, and/or the like to determine the amount of fuel supplied during the hydrocarbon dosing. In such cases, the more fuel needed to reach a target temperature (e.g., to close a loop for the target temperature) during the hydrocarbon dosing, the greater the amount of sulfur in the fuel.

Substance insensitive measurement module 220 may include one or more devices or components configured to receive signals and/or measurements from sensors 210. In some implementations, substance insensitive measurement module 220 may determine values associated with one or more parameters of power system 10, as described herein. For example, if one or more of the sensors are not configured to determine one or more of a soot level, a NOx level, an ammonia level, an amount of fuel during a hydrocarbon dosing of a DOC, and/or a DOC temperature, substance insensitive measurement module 220 may be configured to determine the soot level, the NOx level, the ammonia level, the amount of fuel during the hydrocarbon dosing of the DOC, and/or the DOC temperature based on measurement signals received from sensors 210 (and/or components of sensors 210). Substance insensitive measurement module 220 may determine a measurement of a parameter independent from and/or regardless of an amount of a particular substance in fuel being consumed by engine 12. As shown, substance insensitive measurement module 220 may be included within and/or implemented by ECM 40.

Substance sensitive estimation module 230 may include one or more devices or components configured to estimate values of one or more parameters of power system 10 (e.g., the one or more parameters that correspond to the one or more parameters measured by substance insensitive measurement module 220). As shown, substance sensitive estimation module 230 receives measurements from sensors 210, and a predetermined substance value. The predetermined substance value is a fixed value or an assumed value for a substance sensitive model (which may be referred to herein as "the model") associated with substance sensitive estimation module 230. The predetermined substance value may correspond to a value representative of an amount of the substance that is assumed to be in the fuel consumed by engine 12. For example, if engine 12 is configured to operate using a fuel with 500 ppm of sulfur, the predetermined value for a sulfur sensitive model of substance sensitive estimation module 230 may be 500 ppm. Accordingly, substance sensitive estimation module 230 may estimate a value of a parameter according to an assumed amount of a substance in fuel being consumed by engine 12. As shown, substance sensitive estimation module 230 may be included within and/or implemented by ECM 40.

As described herein, the model may be used to estimate values for the one or more parameters (which may be referred to herein as "estimations") according to the predetermined substance value and the measurements from sensors 210. For example, substance sensitive estimation module 230 may estimate a soot level, a NOx level, and/or an ammonia level associated with power system 10 based on the predetermined substance value, a received temperature measurement associated with exhaust aftertreatment device 34, a received air flow measurement associated with exhaust aftertreatment device 34, and/or any other measurements that may be used to estimate the soot level. Additionally, or alternatively, a substance sensitive estimation module 230 may estimate an outlet temperature of a DOC based on the predetermined substance value, a received hydrocarbon dosing rate measurement, a received air flow measurement associated with exhaust aftertreatment device 34, and/or any other measurements that may be used to estimate the outlet temperature of the DOC.

As mentioned above, the measured parameters of substance insensitive measurement module 220 may correspondingly be estimated by substance sensitive estimation module 230 using the predetermined value for the amount of the substance. For example, for a substance insensitive measurement module 220 that measures a soot level associated with power system 10, ECM 40 may include a substance sensitive estimation module 230 to estimate the soot level. Additionally, or alternatively, for a substance insensitive measurement module 220 that measures a NOx level associated with power system 10, ECM 40 may include a substance sensitive estimation module 230 to estimate the NOx level. Furthermore, for a substance insensitive measurement module 220 that measures an ammonia level associated with power system 10, ECM 40 may include a substance sensitive estimation module to estimate the ammonia level. Moreover, for a substance insensitive measurement module 220 that measures an outlet temperature of a DOC of power system 10, ECM 40 may include a substance sensitive estimation module 230 to estimate the outlet temperature of the DOC. In some implementations, one or more of the substance sensitive estimation modules 230 may use a same predetermined substance value in the models used to determine the estimations of the respective parameters.

In this way, substance insensitive measurement modules 220 and substance sensitive estimation modules 230 may provide measurements and estimations, respectively, which may be compared in order to determine whether the predetermined substance value used by substance sensitive estimation modules 230 is accurate.

Substance detection module 240 may include one or more devices configured to detect a substance in the fuel and/or determine an amount of the substance in the fuel. In some implementations, substance detection module 240 may detect the substance in the fuel based on determining that an amount of the substance in a fuel satisfies (or likely satisfies) a threshold amount. As shown, substance detection module 240 may be included within and/or implemented by ECM 40.

As described herein, substance detection module 240 may determine an amount of a substance in the fuel (e.g., sulfur or other type of substance that can be in a fuel) of power system 10 using measurements of one or more parameters received from substance insensitive measurement module 220 and estimations of the one or more parameters received from substance sensitive estimation module 230. The amount of the substance may correspond to a percentage of the fuel that includes the substance (e.g., a ppm of the substance relative to the content of the fuel) and/or a total quantity of the substance in the fuel. The amount of the substance in the fuel may be determined according to the predetermined value for the substance used in one or more models associated with substance sensitive estimation modules 230, as described herein.

In some implementations, substance detection module 240 may compare a measurement of a parameter received from and/or determined by substance insensitive measurement module 220 and an estimation of the parameter received from and/or determined by substance sensitive estimation module 230 to determine whether the predetermined substance value is representative of the amount of substance in the fuel being consumed by engine 12. For example, if the measured parameter and the estimated parameter are not within a threshold range of each other, substance detection module 240 may determine that the predetermined substance value is not indicative of the amount of the substance in the fuel. In other words, substance detection module 240 may determine that the model is using an inaccurate assumption of the amount of the substance in the fuel that is being consumed by engine 12. Furthermore, substance detection module 240 may infer (e.g., from the inaccurate assumption and/or from the measured parameter not being within a threshold range of the estimated parameter (or vice versa) that engine 12 is consuming fuel that is not a designated type of fuel (in a case in which the predetermined substance value corresponds to the amount of substance that is in the designated type of fuel). In some implementations, the threshold range may depend on the type of the parameter (e.g., soot level, NOx level, ammonia level, outlet temperature of the DOC, and/or the like) that is being analyzed to determine the amount of substance in the fuel. On the other hand, if the measured parameter and the estimated parameter are within a threshold range, substance detection module 240 may determine that engine 12 is operating using the designated type of fuel. In such a case, ECM 40 may enable and/or permit engine 12 to operate accordingly (e.g., according to a standard operation that involves using engine 12 while engine 12 consumes the designated type of fuel).

In some implementations, substance detection module 240 may use a plurality of parameters to determine an amount of a substance in a fuel being consumed by engine 12 and/or whether the amount of the substance corresponds to an amount of the substance in a designated type of fuel for engine 12. For example, substance detection module 240 may determine a probability that a threshold amount of a substance is in a fuel by comparing corresponding measurements and estimations of each of the plurality of respective parameters. Substance detection module 240 may use a scoring system to determine a probability that the threshold amount of the substance is in the fuel by weighting one or more parameters relative to the other parameters of the plurality of parameters (e.g., based on a reliability and/or level of correlation between the parameter and the amount of the substance in the fuel). For example, historical information may indicate that a soot level more closely correlates with an amount of the substance in the fuel than a NOx level. In such a case, substance detection module 240 may be configured to rely more heavily on a comparison of a measured soot level with an estimated soot level than a comparison of a measured NOx level and an estimated NOx level by applying a larger weight to the soot level comparison.

In some implementations, substance detection module 240 may track the historical information associated with determining an amount of the substance, as described herein, based on comparisons of measured parameters and/or estimated parameters to determine a weighting for the parameters. For example, substance detection module 240 may use a machine learning model to determine the probability that a fuel being consumed by engine 12 includes a threshold amount of a substance. The machine learning model may be trained based on the historical information, the one or more parameters, the one or more measurements associated with the parameters, the one or more estimations associated with the parameters, one or more operating conditions associated with engine 12, and/or the like. Accordingly, substance detection module 240 may use the machine learning model to determine a probability that the amount of the substance satisfies the threshold amount.

In some implementations, substance detection module 240 may process a plurality of iterations of the model used to determine an estimation of the parameter in order to determine an amount of the substance within the fuel. For example, for each iteration, substance detection module 240 may alter the predetermined substance value to another value (e.g., a value that would cause the estimation of the parameter to be closer to the measurement of the parameter and/or equate to the measurement). In such a case, substance detection module 240 may adjust the predetermined substance value until an iteration finds an estimation of the parameter that is within the threshold range of the measurement and/or that is equivalent to the measurement. Therefore, substance detection module 240 may determine the amount of the substance in the fuel being consumed by engine 12.

Accordingly, substance detection module 240 may be configured to determine a probability that engine 12 is consuming a fuel that is not a designated type of fuel for engine 12. Based on the probability (e.g., the probability satisfying a threshold probability), substance detection module 240 may cause ECM 40 to alter an operation of engine 12 accordingly and/or alert a user (e.g., an operator) that engine 12 is consuming a fuel that is not the designated type of fuel for engine 12.

User device 250 includes one or more devices capable of receiving, generating, storing, processing, and/or providing information associated with a determined amount of a substance in a fuel associated with power system 10 and/or a determined fuel type of the fuel associated with power system 10. For example, user device 250 may include an operator station of a machine associated with power system 10 (e.g., a machine powered by power system 10). Additionally, or alternatively, the user device 250 may include a computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. User device 250 may be configured to receive notifications from ECM 40. For example, user device 250 may be communicatively coupled with ECM 40, such that user device 250 may receive a notification, from ECM 40, that indicates that an amount of a substance in a fuel satisfies a threshold and/or that engine 12 may be consuming a fuel that is not the designated type of fuel for engine 12. In this way, ECM 40 may cause (e.g., via the notification) a user interface of user device 250 to alert a user (e.g., an operator of a machine associated with power system 10) that engine 12 may not be consuming the designated type of fuel.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of fuel content detection system 200 may perform one or more functions described as being performed by another set of devices of fuel content detection system 200.

FIG. 3 is a flow chart of an example process 300 for fuel content detection based on a measurement from a sensor and a model estimation of the measurement. In some implementations, one or more process blocks of FIG. 3 may be performed by an ECM (e.g., ECM 40). In some implementations, one or more process blocks of FIG. 3 may be performed by another device or a group of devices separate from or including an ECM (e.g., ECM 40), such as sensors (e.g., sensors 210), a substance detection module (e.g., substance detection module 240), a substance insensitive module (e.g., substance insensitive measurement module 220), a substance sensitive estimation module (e.g., substance sensitive estimation module 230), a user device (e.g., user device 50), and/or the like.

As shown in FIG. 3, process 300 may include receiving a measurement of a parameter, wherein the parameter correlates with an amount of a substance in a fuel that is being consumed in an engine (block 310). For example, the ECM (e.g., using substance insensitive measurement module 220, substance detection module 240, and/or the like) may receive a measurement of a parameter, as described above. In some implementations, the parameter correlates with an amount of a substance in a fuel that is being consumed in an engine.

As further shown in FIG. 3, process 300 may include determining an estimation of the parameter based on a model, wherein the model uses a predetermined value associated with the amount of the substance, wherein the engine is configured to consume a designated type of fuel that includes an amount of the substance that corresponds to the predetermined value (block 320). For example, the ECM (e.g., using substance sensitive estimation module 230, substance detection module 240, and/or the like) may determine an estimation of the parameter based on a model, as described above. In some implementations, the model uses a predetermined value associated with the amount of the substance. In some implementations, the engine is configured to consume a designated type of fuel that includes an amount of the substance that corresponds to the predetermined value.

As further shown in FIG. 3, process 300 may include determining, based on the estimation and the measurement not being within a threshold range, that the fuel is not the designated type of fuel (block 330). For example, the ECM (e.g., using substance detection module 240, and/or the like) may determine, based on the estimation and the measurement not being within a threshold range, that the fuel is not the designated type of fuel, as described above.

As further shown in FIG. 3, process 300 may include performing, based on determining that the fuel is not the designated type of fuel, an action associated with the engine, an action associated with the engine (block 340). For example, the ECM (e.g., using substance detection module 240, and/or the like) may perform, based on determining that the fuel is not the designated type of fuel, an action associated with the engine, an action associated with the engine, as described above.

Process 300 may include additional implementations, such as any single implementation or any combination of implementations described below and/or in connection with one or more other processes described elsewhere herein.

In some implementations, the parameter comprises at least one of: a soot level in a filter of the engine, a NOx level of exhaust of the engine, an ammonia level of exhaust of the engine, or a temperature of an exhaust aftertreatment device, of the engine, during a hydrocarbon dosing. In some implementations, the substance includes sulfur.

In some implementations, the ECM, when performing the action, may cause the engine to be controlled to decrease a power output relative to a standard operation of the engine or cease an operation to prevent the engine from consuming the fuel. In some implementations, the ECM, when performing the action, may cause the engine to be controlled, via a control device, to operate at an increased temperature, relative to a standard operation of the engine, to reduce the amount of the substance in the fuel.

Additionally, or alternatively, a process may include receiving a measurement of a parameter, wherein the measurement correlates with an amount of a substance in a fuel used during operation of an engine. For example, the ECM (e.g., using substance insensitive measurement module 220, substance detection module 240, and/or the like) may receive a measurement of a parameter, as described above. In some implementations, the measurement correlates with an amount of a substance in a fuel used during operation of an engine.

Such a process may include determining, using a model, an estimation of the parameter, wherein, to determine the estimation of the parameter, the model uses a predetermined value associated with the amount of the substance. For example, the ECM (e.g., using substance sensitive estimation module 230, substance detection module 240, and/or the like) may determine, using a model, an estimation of the parameter, as described above. In some implementations, to determine the estimation of the parameter, the model uses a predetermined value associated with the amount of the substance.

Such a process may include determining, based on the estimation and the measurement, whether the predetermined value is representative of the amount of the substance in the fuel, wherein the predetermined value is determined to be representative of the amount of the substance when the estimation is within a threshold range of the measurement. For example, the ECM (e.g., using substance detection module 240, and/or the like) may determine, based on the estimation and the measurement, whether the predetermined value is representative of the amount of the substance in the fuel, as described above. In some implementations, the predetermined value is determined to be representative of the amount of the substance when the estimation is within a threshold range of the measurement.

Such a process may include performing, by the engine control module and based on whether the predetermined value is determined to be representative of the amount of the substance in the fuel, an action associated with the engine. For example, the ECM (e.g., using substance detection module 240, and/or the like) may perform, by the engine control module and based on whether the predetermined value is determined to be representative of the amount of the substance in the fuel, an action associated with the engine, as described above.

Such a process may include additional implementations, such as any single implementation or any combination of implementations described below and/or in connection with one or more other processes described elsewhere herein.

In some implementations, the measurement is received from a soot level sensor, the parameter corresponds to a soot level in a filter of the engine, and the measurement corresponds to a measured amount of soot in the filter. In some implementations, the model is a soot level estimation model, and the estimation corresponds to an estimated amount of soot in the filter.

In some implementations, the measurement is received from a nitrogen oxide (NOx) emission sensor, the parameter corresponds to a NOx level of exhaust of the engine, and the measurement corresponds to a measured amount of NOx in the exhaust. In some implementations, the model is a NOx level estimation model, and the estimation corresponds to an estimated amount of NOx in the exhaust.

In some implementations, the measurement is received from an ammonia emission sensor, the parameter corresponds to an ammonia level of exhaust of the engine, and the measurement corresponds to a measured amount of ammonia in the exhaust. In some implementations, the model is an ammonia level estimation model, and the estimation corresponds to an estimated amount of ammonia in the exhaust.

In some implementations, the measurement is associated with an amount of fuel for a hydrocarbon dosing of a diesel oxidation catalyst (DOC), and the parameter corresponds to the amount of fuel supplied during the hydrocarbon dosing. In some implementations, the model is a hydrocarbon dosing estimation model, and the estimation corresponds to an estimated amount of fuel supplied for the hydrocarbon dosing.

In some implementations, the engine is configured to operate using a designated fuel type, and the designated fuel type has the amount of the substance that corresponds to the predetermined value. In some implementations, when the predetermined value is determined to be representative of the amount of the substance in the fuel, the ECM may determine that a type of the fuel is the designated fuel type, and the ECM, when performing the action, may enable operation of the engine in accordance with the designated fuel type.

In some implementations, when the predetermined value is determined to be not representative of the amount of the substance in the fuel, the ECM, when performing the action, may cause the engine to be controlled to modify operation of the engine.

In some implementations, when the predetermined value is determined to be not representative of the amount of the substance in the fuel, the ECM, when performing the action, may provide a notification, to a user device that is communicatively coupled with the engine control module, to indicate that the engine may be consuming a fuel that includes an amount of the substance that is different from the amount of the substance represented by the predetermined value.

In some implementations, when the predetermined value is determined to not be representative of the amount of the substance in the fuel, the ECM, when performing the action, may process iterations of the model using different quantities of the substance, to determine an estimated amount of the substance. In some implementations, the estimated amount of the substance corresponds to an amount that provides, in one of the iterations, an estimation of the parameter that is within the threshold range of the measurement. In some implementations, the ECM may cause the engine to be controlled based on the determined estimated amount of the substance. In some implementations, the substance is sulfur.

Additionally, or alternatively, a process may include receiving, from the sensor, a measurement of a parameter of the engine, wherein the parameter correlates with an amount of sulfur in the fuel. For example, the ECM (e.g., using substance insensitive measurement module 220, substance detection module 240, and/or the like) may receive, from the sensor, a measurement of a parameter of the engine, as described above. In some implementations, the parameter correlates with an amount of sulfur in the fuel.

Such a process may include determining, using a model, an estimation of the parameter, wherein, to determine the estimation of the parameter, the model assumes a value of the amount of sulfur in the fuel that correlates with the threshold amount of sulfur. For example, the ECM (e.g., using substance sensitive estimation module 230, substance detection module 240, and/or the like) may determine, using a model, an estimation of the parameter, as described above. In some implementations, to determine the estimation of the parameter, the model assumes a value of the amount of sulfur in the fuel that correlates with the threshold amount of sulfur.

Such a process may include determining, based on the estimation and the measurement, that the amount of sulfur in the fuel does not satisfy the threshold amount of sulfur. For example, the ECM (e.g., using substance detection module 240, and/or the like) may determine, based on the estimation and the measurement, that the amount of sulfur in the fuel does not satisfy the threshold amount of sulfur, as described above.

Such a process may include performing, based on determining that the amount of sulfur in the fuel does not satisfy the threshold amount of sulfur, an action associated with the engine. For example, the ECM (e.g., using substance detection module 240, and/or the like) may perform, based on determining that the amount of sulfur in the fuel does not satisfy the threshold amount of sulfur, an action associated with the engine, as described above.

Such a process may include additional implementations, such as any single implementation or any combination of implementations described below and/or in connection with one or more other processes described elsewhere herein.

In some implementations, the parameter comprises at least one of: a soot level in a filter of the engine, a nitrogen oxide level of exhaust of the engine, an ammonia level of exhaust of the engine, or a temperature of an exhaust aftertreatment device, of the engine, during a hydrocarbon dosing.

In some implementations, the ECM, when determining that the amount of sulfur in the fuel does not satisfy the threshold amount of sulfur, may determine that the estimation is outside of a threshold range of the measurement and determine, based on the estimation being outside of the threshold range of the measurement, that the amount of sulfur in the fuel does not satisfy the threshold amount of sulfur.

In some implementations, the ECM, when performing the action, may cause one or more control devices to control the engine to at least one of: reduce an output power relative to a standard operation of the engine or increase an operation temperature relative to a standard operation of the engine to permit the engine, at the increased operation temperature, to burn off sulfur in the fuel. In some implementations, the ECM, when performing the action, may cause the user interface to alert a user that the engine may not be consuming the designated type of fuel.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

An engine may be configured to consume a designated type of fuel. However, due to human error and/or unforeseen chemical reactions within fuel, an engine may consume a type of fuel that is different from the designated type of fuel. The consumed fuel may be different from the designated type of fuel in that the consumed fuel is not made up of substances in a particular ratio in the designated type of fuel. As mentioned above, the engine may be configured to consume a low sulfur content fuel, an ultra-low sulfur content fuel, and/or the like. In such cases, if the engine consumes a fuel with relatively high sulfur content, performance of the engine may be inhibited, the engine can be damaged, and/or one or more other parts (e.g., of a machine) associated with the engine can be damaged.

According to some implementations, an ECM may determine, in real-time, a probability that an engine is consuming a fuel that includes a threshold amount of a substance (e.g., sulfur). In this way, the ECM may determine that the engine is to be controlled and/or operated in a manner to account for the threshold amount of the substance in the fuel. For example, if the substance is sulfur, the ECM may cause power output from the engine to be throttled down, may cause the engine to operate at a relatively increased operating temperature (e.g., to burn off the substance), may cause the engine to cease an operation and/or shut down completely, and/or the like. Furthermore, the ECM may alert an operator that the engine is consuming a fuel with the threshold amount of the substance to permit the operator to take appropriate action. In this way, the ECM may prevent further damage to the engine that would otherwise occur by continuing to operate the engine as if the engine were operating using a designated fuel for the engine. As a result, various costs (e.g., fuel costs, emissions, hardware costs, and/or the like) and/or resources (e.g., processing resources, power resources, human resources, and/or the like) associated with monitoring, operating, maintaining, and/or repairing an engine, that consumed or is consuming a fuel with an undesirable amount of a substance, can be conserved relative to previous techniques.

Additionally, or alternatively, as described herein, an ECM may use a model from a sulfur sensitive estimation module to estimate a value of a parameter. In some implementations, the ECM may determine the accuracy of the model (e.g., an accuracy of a predetermined substance value of the model) to determine whether the model is to be adjusted. For example, the ECM may determine, based on a substance insensitive measurement associated with the engine, that an input of the model is inaccurate (e.g., the input for the amount of the substance). In this way, the ECM may be able to adjust the model and/or provide feedback to cause the model to be adjusted. Furthermore, the ECM may infer from the inaccuracy that there is a probability that there is a threshold amount of the substance in the fuel.

Furthermore, an ECM of an engine can be programmed to perform the methods and/or processes described herein. In other words, one or more sensors (e.g., a sulfur sensor) may not need to be included and/or attached within a power system to determine an amount of sulfur in a fuel of the engine, which may add costs and/or further complicate the power system (e.g., assembly of the power system, maintenance of the power system, programming of the power system, and/or the like). In this way, costs associated with including an additional sensor to determine a content of a substance in fuel associated with an engine can be conserved and/or avoided (e.g., by updating an ECM of an engine to perform one or more methods or processes described herein).

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the articles "a" and "an" are intended to include one or more items and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
    receiving a measurement of a parameter,
        wherein the measurement correlates with an amount of a substance in a fuel used during operation of an engine;
    determining, using a model, an estimation of the parameter,
        wherein, to determine the estimation of the parameter, the model uses a predetermined value associated with the amount of the substance;
    determining, based on the estimation and the measurement, whether the predetermined value is representative of the amount of the substance in the fuel,
        wherein the predetermined value is determined to be representative of the amount of the substance when the estimation is within a threshold range of the measurement; and
    performing, based on whether the predetermined value is determined to be representative of the amount of the substance in the fuel, an action associated with the engine.

2. The method of claim 1, wherein the measurement is received from a soot level sensor,
wherein the parameter corresponds to a soot level in a filter of the engine,
wherein the measurement corresponds to a measured amount of soot in the filter, and
wherein the model is a soot level estimation model,
wherein the estimation corresponds to an estimated amount of soot in the filter.

3. The method of claim 1, wherein the measurement is received from a nitrogen oxide (NOx) emission sensor,
wherein the parameter corresponds to a NOx level of exhaust of the engine,
wherein the measurement corresponds to a measured amount of NOx in the exhaust, and
wherein the model is a NOx level estimation model,
wherein the estimation corresponds to an estimated amount of NOx in the exhaust.

4. The method of claim 1, wherein the measurement is received from an ammonia emission sensor,
wherein the parameter corresponds to an ammonia level of exhaust of the engine,
wherein the measurement corresponds to a measured amount of ammonia in the exhaust, and
wherein the model is an ammonia level estimation model,
wherein the estimation corresponds to an estimated amount of ammonia in the exhaust.

5. The method of claim 1, wherein the measurement is associated with an amount of fuel for a hydrocarbon dosing of a diesel oxidation catalyst (DOC),
wherein the parameter corresponds to the amount of fuel supplied during the hydrocarbon dosing, and
wherein the model is a hydrocarbon dosing estimation model,
wherein the estimation corresponds to an estimated amount of fuel supplied for the hydrocarbon dosing.

6. The method of claim 1, wherein the engine is configured to operate using a designated fuel type,
wherein the designated fuel type has the amount of the substance that corresponds to the predetermined value, and
when the predetermined value is determined to be representative of the amount of the substance in the fuel, the method comprises:
determining that a type of the fuel is the designated fuel type, and
wherein performing the action comprises:
enabling operation of the engine in accordance with the designated fuel type.

7. The method of claim 1, wherein, when the predetermined value is determined to be not representative of the amount of the substance in the fuel, performing the action comprises:
causing the engine to be controlled to modify operation of the engine.

8. The method of claim 1, wherein, when the predetermined value is determined to be not representative of the amount of the substance in the fuel, performing the action comprises:
providing a notification, to a user device that is communicatively coupled with the engine control module, to indicate that the engine may be consuming a fuel that includes an amount of the substance that is different from the amount of the substance represented by the predetermined value.

9. The method of claim 1, wherein, when the predetermined value is determined to not be representative of the amount of the substance in the fuel, performing the action comprises:
processing iterations of the model using different quantities of the substance;
determining an estimated amount of the substance,
wherein the estimated amount of the substance corresponds to an amount that provides, in one of the iterations, an estimation of the parameter that is within the threshold range of the measurement; and
causing the engine to be controlled based on the determined estimated amount of the substance.

10. The method of claim 1, wherein the substance is sulfur.

11. An engine control module, comprising:
a memory; and
one or more processors, communicatively coupled to the memory, to:
receive a measurement of a parameter,
wherein the parameter correlates with an amount of a substance in a fuel that is being consumed in an engine;
determine an estimation of the parameter based on a model,
wherein the model uses a predetermined value associated with the amount of the substance,
wherein the engine is configured to consume a designated type of fuel that includes an amount of the substance that corresponds to the predetermined value;
determine, based on the estimation and the measurement not being within a threshold range, that the fuel is not the designated type of fuel; and
perform, based on determining that the fuel is not the designated type of fuel, an action associated with the engine.

12. The engine control module of claim 11, wherein the parameter comprises at least one of:
a soot level in a filter of the engine,
a nitrogen oxide (NOx) level of exhaust of the engine,
an ammonia level of exhaust of the engine,
an amount of fuel supplied during a hydrocarbon dosing of a diesel oxidation catalyst (DOC) of the engine, or
a temperature of an exhaust aftertreatment device, of the engine, during a hydrocarbon dosing.

13. The engine control module of claim 11, wherein the substance includes sulfur.

14. The engine control module of claim 11, wherein the one or more processors, when performing the action, are to at least one of:
cause the engine to be controlled to decrease a power output relative to a standard operation of the engine, or
cease an operation to prevent the engine from consuming the fuel.

15. The engine control module of claim 11, wherein the one or more processors, when performing the action, are to:
cause the engine to be controlled, via a control device, to operate at an increased temperature, relative to a standard operation of the engine, to reduce the amount of the substance in the fuel.

16. A system comprising:
an engine configured to, during operation, consume a designated type of fuel that includes a threshold amount of sulfur;
a sensor; and
an engine control module configured to, while the engine is consuming a fuel during operation:
  receive, from the sensor, a measurement of a parameter of the engine,
    wherein the parameter correlates with an amount of sulfur in the fuel;
  determine, using a model, an estimation of the parameter,
    wherein, to determine the estimation of the parameter, the model assumes a value of the amount of sulfur in the fuel that correlates with the threshold amount of sulfur;
  determine, based on the estimation and the measurement, that the amount of sulfur in the fuel does not satisfy the threshold amount of sulfur; and
  perform, based on determining that the amount of sulfur in the fuel does not satisfy the threshold amount of sulfur, an action associated with the engine.

17. The system of claim 16, wherein the parameter comprises at least one of:
a soot level in a filter of the engine,
a nitrogen oxide (NOx) level of exhaust of the engine,
an ammonia level of exhaust of the engine,
an amount of fuel supplied during a hydrocarbon dosing of a diesel oxidation catalyst (DOC) of the engine, or
a temperature of an exhaust aftertreatment device, of the engine, during a hydrocarbon dosing.

18. The system of claim 16, wherein the engine control module, when determining that the amount of sulfur in the fuel does not satisfy the threshold amount of sulfur, is to:
determine that the estimation is outside of a threshold range of the measurement; and
determine, based on the estimation being outside of the threshold range of the measurement, that the amount of sulfur in the fuel does not satisfy the threshold amount of sulfur.

19. The system of claim 16, wherein the system further comprises:
one or more control devices,
wherein, the engine control module, when performing the action, is to:
  cause the one or more control devices to control the engine to at least one of:
    reduce an output power relative to a standard operation of the engine, or
    increase an operation temperature relative to a standard operation of the engine to permit the engine, at the increased operation temperature, to burn off sulfur in the fuel.

20. The system of claim 16, wherein the system further comprises:
a user interface,
wherein, the engine control module, when performing the action, is to:
  cause the user interface to alert a user that the engine may not be consuming the designated type of fuel.

* * * * *